(12) United States Patent
Natalaray et al.

(10) Patent No.: US 8,649,073 B2
(45) Date of Patent: Feb. 11, 2014

(54) CONFIGURABLE SCANNER ASSEMBLY

(75) Inventors: Thaddie Natalaray, Singapore (SG);
Kyi Thu Maung, Singapore (SG); U Kyaw Thu Ra, Singapore (SG); Tok Wee Hien, Singapore (SG); Yeo Meng Hui, Singapore (SG); Lam Siew Hong, Singapore (SG); Jeoffrey Goh Choon Kiat, Singapore (SG); Thong Wei Leong, Singapore (SG); Chiam Ter Wei, Singapore (SG); Long C. Doan, San Diego, CA (US); Jeffrey C. Madsen, Eagle, ID (US); Curtis J. Behrend, San Diego, CA (US); James C Albritton-Mcdonald, Bellevue, CO (US); Keng-Leong Ng, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 333 days.

(21) Appl. No.: 13/157,769

(22) Filed: Jun. 10, 2011

(65) Prior Publication Data

US 2012/0314266 A1    Dec. 13, 2012

(51) Int. Cl.
*H04N 1/04* (2006.01)
*H04N 1/46* (2006.01)

(52) U.S. Cl.
USPC ............ 358/498; 358/474; 358/496; 358/505

(58) Field of Classification Search
None
See application file for complete search history.

(56) References Cited

U.S. PATENT DOCUMENTS

| 6,134,417 | A | 10/2000 | Fukasawa |
| 7,427,062 | B2 | 9/2008 | Jang |
| 7,578,504 | B2 | 8/2009 | Tsai et al. |
| 7,636,542 | B2 | 12/2009 | Washnock et al. |
| 7,661,675 | B2 | 2/2010 | Lan et al. |
| 7,717,423 | B2 | 5/2010 | Litman et al. |
| 2007/0003339 | A1 | 1/2007 | Edwards et al. |
| 2007/0070458 | A1* | 3/2007 | Sheng ........................... 358/504 |
| 2008/0062477 | A1* | 3/2008 | Jo ................................. 358/498 |
| 2009/0027738 | A1* | 1/2009 | Kim ............................. 358/474 |
| 2009/0027745 | A1* | 1/2009 | Kweon ......................... 358/498 |
| 2010/0149607 | A1 | 6/2010 | Langrel et al. |

* cited by examiner

*Primary Examiner* — Thierry L Pham

(57) ABSTRACT

A scanner assembly includes an automatic document feeder and a first scanner. The automatic document feeder defines a media pathway that includes an input portion and an output portion having an exit roller. The first scanner is positioned along the media pathway upstream from the exit roller. In a first assembled configuration, the assembly is configured to scan both a first side and a second side of the media via the first scanner. In a second assembled configuration, the assembly additionally includes a second scanner positioned along the output portion and interposed between the first scanner and the exit roller. In the second configuration, the assembly is configured to scan the first side of media via the first scanner and to scan the second side of media via the second scanner.

20 Claims, 4 Drawing Sheets

CONFIGURABLE SCANNER ASSEMBLY

BACKGROUND

Electronic scanning has dramatically changed document handling, allowing for convenient document storage and/or easy transmission to a third party. Accordingly, scanning has become a daily occurrence in business settings, and may involve single-sided or double-sided scanning. In one instance, double-sided scanning is accomplished via one type of device having dual scanners. In this arrangement, the device houses a first scanner to scan a first side of a media sheet and also houses a second scanner to scan an opposite, second side of the media sheet. In other instances, a second type device houses a single scanner. In this arrangement, the second type of device scans a first side of a sheet, and then re-feeds the sheet via a return pathway to cause the second side of the sheet to be scanned by the single scanner on a second pass of the sheet.

DETAILED DESCRIPTION

Figure 1:
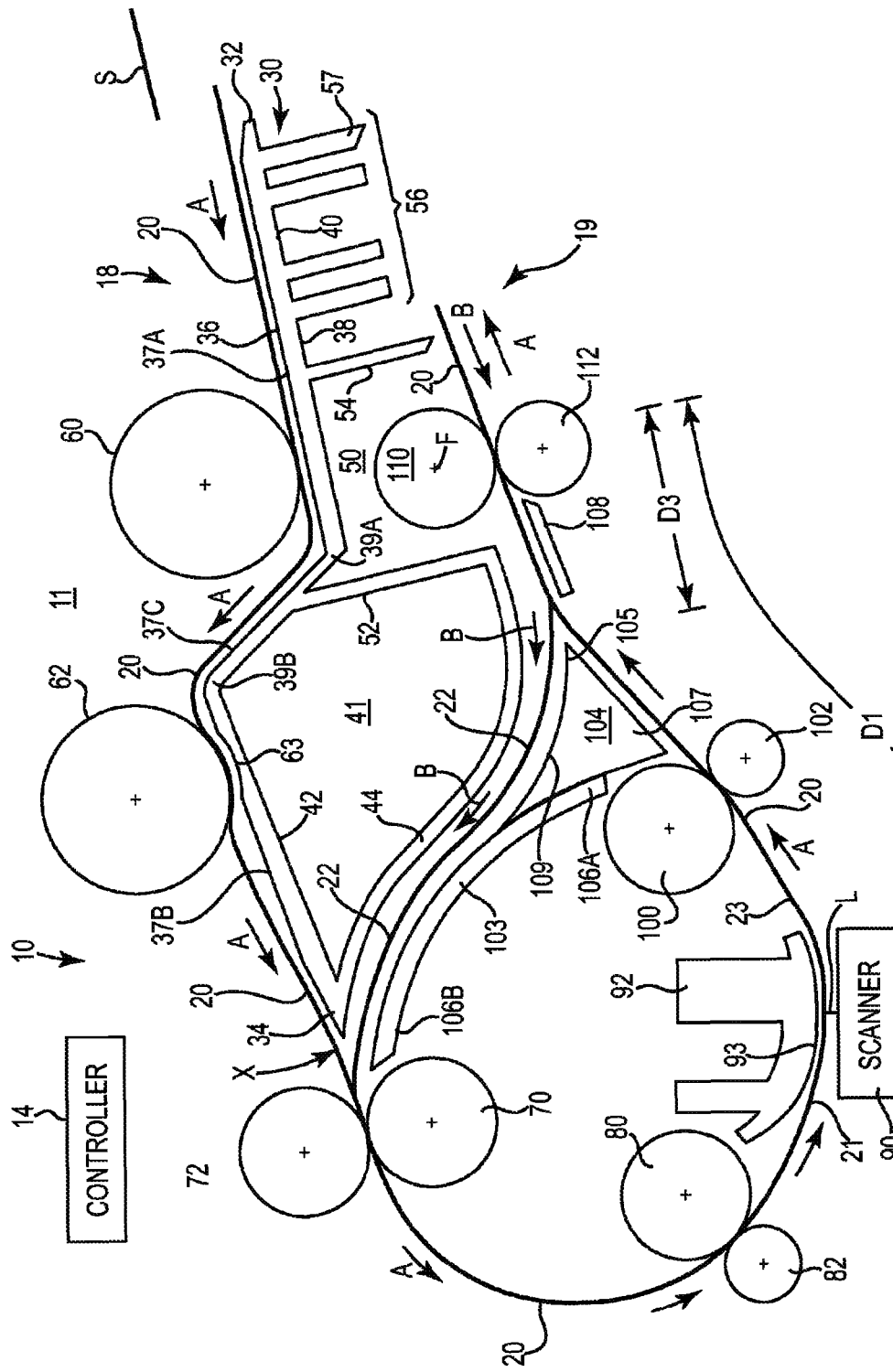
FIG. 1 is a front plan view schematically illustrating a scanner assembly in a first configuration, according to an embodiment of the present disclosure.

In the following detailed description, reference is made to the accompanying drawings which form a part hereof, and in which is shown by way of illustration specific embodiments of the present disclosure which may be practiced. In this regard, directional terminology, such as "top," "bottom," "front," "back," "leading," "trailing," etc., is used with reference to the orientation of the Figure(s) being described. Because components of embodiments of the present disclosure can be positioned in a number of different orientations, the directional terminology is used for purposes of illustration and is in no way limiting. It is to be understood that other embodiments may be utilized and structural or logical changes may be made without departing from the scope of the present disclosure. The following detailed description, therefore, is not to be taken in a limiting sense, and the scope of the present disclosure defined by the appended claims.

Embodiments of the present disclosure are directed to a configurable scanner assembly defining a first media pathway that includes an input portion and an output portion. The first scanner is positioned along the first media pathway upstream from an exit roller of the output portion. In a first assembled configuration, the assembly is configured to scan both a first side and a second side of the media via the first scanner. In a second assembled configuration, the assembly additionally includes a second scanner positioned along the output portion and interposed between the first scanner and the exit roller. In the second configuration, the assembly is configured to scan the first side of media via the first scanner and to scan the second side of media via the second scanner. At the time of manufacture or via retrofitting, the scanner assembly is assembled into at least one of the first and second configurations.

In one embodiment, the scanner assembly includes an automatic document feeder defining at least a portion of the first media pathway and including at least the input portion. In some embodiments, the automatic document feeder includes the output portion as well.

In one embodiment, the first scanner forms part of a flatbed scanning module of a multifunction printer and an automatic document feeder is coupled relative to the flatbed scanner. In this embodiment, in the second assembled configuration the flatbed scanning module supplies the first scanner and the automatic document feeder houses the second scanner. In the first assembled configuration, the flatbed scanning module supplies the first scanner and the automatic document feeder omits any scanners. Accordingly, in this embodiment, while the first scanner is positioned along the media pathway of the automatic document feeder, the first scanner does not form part of the automatic document feeder.

In another embodiment, the scanner assembly comprises a stand-alone scanning unit that incorporates an automatic document feeder. In this embodiment, in the first assembled configuration the scanner assembly includes the first scanner (without the second scanner) and in the second assembled configuration, the scanner assembly includes both the first scanner and the second scanner. In these respective configurations, the respective first and second scanners are both housed by the automatic document feeder and incorporated into a media pathway of the automatic document feeder.

Whether in the first or second assembled configuration, the scanner assembly includes substantially the same main or core elements of an automatic document feeder of the scanner assembly. For example, both the first and second configurations include, in substantially the same position, substantially the same elements including but not limited to: media trays; pick and separation roller modules; deskew modules; pre-scan and post-scan modules; gear train; sensors; cable interface; counterbalance hinges; and selectable background for a first scanner.

Accordingly, one can readily produce a scanner assembly in either a first configuration or a second configuration at the time of manufacture or via retrofitting, while re-using substantially the same core elements of the automatic document feeder of the scanner assembly.

In the first configuration, a first separation floor includes a contact portion at least partially defining the input portion and a bottom portion. In one embodiment, the bottom portion includes a first chamber sized and shaped to partially house the exit roller and a return guide. The return guide is sized and shaped to guide media sheets in a return pathway from the output portion back into to the media pathway at a point upstream from the first scanner.

In order to achieve the second configuration instead of the first configuration, a second separation floor is substituted for the first separation floor with the second separation floor configured to enable re-positioning of the exit roller and to accommodate addition of a second scanner within the space formerly occupied by the exit roller in the first configuration. A bottom portion of the second separation floor includes a first chamber that partially houses the second scanner and a second chamber that partially houses the re-positioned exit roller. In addition, the second separation floor provides a simpler structure which omits a return guide because a return path is no longer used in the second configuration for media sheet to re-enter the media pathway (to allow scanning a second time), as in the first configuration.

By retaining the core elements forming of the media pathway in each of the two different configurations and by switching a few additional elements between the two different configurations, a significant amount of time, money, and effort is saved with embodiments of the present disclosure, thereby avoiding the laborious and expensive conventional process that otherwise occurs when manufacturing and assembling two completely different scanning assemblies to produce a single scanner configuration or a dual scanner configuration.

These embodiments, and additional embodiments, are described and illustrated in association with FIGS. 1-5.

A scanner assembly 10 is schematically illustrated in association with FIG. 1, according to one embodiment of the present disclosure. As shown in FIG. 1, scanner assembly 10 defines a media pathway 20 that is configured to guide a media sheet to pass by a first scanner 90.

In one embodiment, the scanner assembly 10 includes or incorporates an automatic document feeder (ADF). In one aspect, the automatic document feeder includes numerous standard elements, known to those skilled in the art, that define pathway 20 and guide sheets along pathway 20. For example, some of these standard elements include a paper presence flag, a pick success flag, a deskew flag, gear train, sensors, cable interfaces, counterbalance hinges, etc. Because these standard elements generally remain the same whether the scanner assembly 10 is in a single scanner configuration 11 or in a double scanner configuration 125, according to embodiments of the present disclosure, these standard elements associated with the automatic document feeder of the scanner assembly 10 are not shown for illustrative clarity to better highlight the configurable aspects of the scanner assembly 10.

With this in mind, first configuration 11 of scanner assembly 10 includes an input portion 18 and an output portion 19. The input portion 18 includes a first separation floor 30 having a first end portion 32, second end portion 34, upper contact portion 36, and bottom portion 38. The upper contact portion 36 provides a contoured surface over which sheets (S) travel along media pathway 20. While the contact portion 36 has a generally Z-shaped structure as shown in FIG. 1, it will be understood that contact portion 36 could take a variety of shapes and forms other than that shown in FIG. 1 or 2. Details regarding bottom portion 38 are further described below.

Input portion 18 of scanner assembly 10 further includes pick roller 60 and separation roller 62 which are positioned along media pathway 20 opposite contact portion 36 of first separation floor 30. Together, the pick roller 60 and separation roller 62 act in cooperation with first separation floor 30 to pick a sheet (S) from a stack of media sheets and cause the sheet to advance along pathway 20 toward a scanner, in a manner familiar to those skilled in the art. In one embodiment, contact portion 36 includes a first generally flat portion 37A and a second generally flat portion 37B with ramp portion 37C interposed therebetween. The pick roller 60 is located opposite first generally flat portion 37A and adjacent a junction 39A between the first generally flat portion 37A and the ramp portion 37C of first separation floor 30. The separation roller 62 is located opposite second generally flat portion 37B of first separation floor 30 adjacent a junction 39B between ramp portion 37C and second generally flat portion 37B. In some embodiments, second generally flat portion 37B includes a recess portion 63 to facilitate separation of a single sheet for advancement along media pathway 20. At locations downstream from separation roller 62, a single sheet is conveyed (as represented by directional arrow A) along paper pathway 20.

Media pathway 20 continues along second generally flat portion 37B (of first separation floor 30) until a sheet encounters deskew rollers 70, 72, which are configured to straighten or align a sheet along pathway 20, thereby ensuring proper alignment of sheet relative to first scanner 90.

Beginning at deskew rollers 70, 72, media pathway 20 takes a generally C-shaped path through pre-scan rollers 80, 82 and through post-scan rollers 100, 102, with first scanner 90 interposed between pre-scan rollers 80, 82 and post-scan rollers 100, 102. In one aspect, first scanner 90 is located on first side of media pathway 20 opposite a second side 23 of media pathway 20. In one embodiment, first scanner 90 is positioned along the media pathway 20 but does not form part of the automatic document feeder. In this embodiment, the first scanner 90 is supplied by a flatbed scanning module of a stand alone scanner or of a multifunction printer. The automatic document feeder is coupled relative to the flatbed scanning module to enable the first scanner to be positioned along the media pathway of the automatic document feeder. In another embodiment, first scanner 90 forms part of an automatic document feeder of the scanner assembly and, therefore, is not supplied from a separate unit such as a flatbed scanning module.

In another aspect, media pathway 20 is further defined by background module 92 located on the second side 23 of media pathway 20, opposite from first scanner 90. The scan background module 92 provides a background surface 93 during scanning via first scanner 90. In one embodiment, background surface 93 is static (i.e. not movable). However, in other embodiments, the surface 93 of background module 92 includes multiple background portions (e.g. white, black, etc.) and is rotatable relative to first scanner 90 such that a different background portion is automatically moved into an operative position relative to scanner depending upon the type of scanning being performed via first scanner 90.

In one embodiment, background surface 93 of background module 92 includes among its different background portions a scanner calibration element while, in other instances, the scanner calibration element is located elsewhere, such as when first scanner 90 is mobile.

In general terms, the generally C-shaped route of pathway 20 between deskew rollers 70, 72 and post-scan rollers 100, 102 allows the sheet moving along pathway 20 to change its general direction of movement so that upon eventually exiting pathway 20, the output portion 19 is located adjacent the input portion 18 (at which the media sheet S entered the media pathway 20). Looking downstream from post-scan rollers 100, 102, pathway 20 is further defined by a bottom portion 107 of separator 104, support 108, and exit rollers 110, 112. In one embodiment, the output portion 19 of scanner assembly 10 includes: (1) the portion of media pathway 20 that extends downstream from the tip 105 of separator 104 toward and including exit rollers 110, 112; (2) the portion of media pathway 20 extending downstream from exit rollers 110, 112.

In one aspect, exit roller 110 is located within a recess or chamber 50 defined by bottom portion 38 of first separation floor 30. In particular, bottom portion 38 of first separation floor 30 includes a first wall 52 and a second wall 54 extending generally perpendicular and outward in a direction opposite contact portion 36 such that chamber 50 is defined between the first and second walls 52, 54. Moreover, in some embodiments, bottom portion 38 includes a support structure 56 having multiple fingers or ribs 57.

In one aspect, media pathway 20 defines a distance (D1) extending from scan line (L) of first scanner 90 to a rotational axis (F) of exit roller 110. In another aspect, media pathway 20 defines a distance (D3) between tip 105 of separator 104 and a rotational axis (F) of exit roller 110.

Because first configuration 11 of scanner assembly 10 has just one scanner (e.g. first scanner 90), the scanner assembly 10 includes a mechanism common in an automatic document feeder to reverse the travel direction (as represented by directional arrows B) of the sheet and direct the sheet by the first scanner 90 a second time so that the opposite (not-yet-scanned) side of the sheet can be scanned prior to exiting the scanner assembly 10. Accordingly, in one embodiment, adjacent its second end portion 34, bottom portion 38 of first separation floor 30 includes a first return guide 41. In one aspect, first return guide 41 includes a surface portion 44 defining return pathway 22 that extends from tip 105 of separator 104 to point (X) along media pathway 20, which is located just upstream from deskew rollers 70, 72. In other embodiments, the surface portion 44 is an element that is separate of, and independent from, first separation floor 30.

In one embodiment, a second return guide 103 is located opposite the surface portion 44 of first return guide 41 and further defines media return pathway 22. In one aspect, the second return guide 103 has a generally arcuate shape, and extends from a first end 106A adjacent separator 104 to a second end 106B adjacent deskew roller 70. It will be further understood that in some embodiments, as familiar to those skilled in the art, that the tip 105 of separator 104 is equipped with a diverter flap that is configured to allow a media sheet to exit path 20 from rollers 100,102 but that prevents a media sheet from re-entering path 20 when the direction of travel of the media sheet is reversed. Accordingly, the diverter flap associated with tip 105 of separator 104 ensures that the media sheet travels along media return pathway 22 when the direction of travel is reversed.

With these structures in mind, FIG. 1 illustrates how a media sheet would travel in direction B along media return pathway 22 that extends from tip 105 of separator 104, along upper portion 109 of separator 104, between surface portion 44 of first return guide 41 and second return guide 103, and up to point (X) near deskew roller 70. At point X, media return pathway 22 delivers the sheet for re-entry into the media pathway 20 and travel along media pathway 20 (in direction A) a second time to allow scanning via first scanner 90 of the not-yet-scanned side of the sheet.

After completing a second pass by first scanner 90, the sheet continues along media pathway 20 on toward output portion 19, at which time controller 14 directs that the sheet S be "flipped" one more time to return the sheet to its original orientation after the first scan (i.e. first side facing up). To do so, the sheet is fed back in direction B into media return pathway 22 a second time, and sheet enters media pathway 20 at point X before traveling media pathway 20 (in direction A) a third and final time without being scanned by first scanner 90. After passing by first scanner 90, the sheet passes into and through output portion 19 so the sheet can be directed into an output tray.

Figure 2:
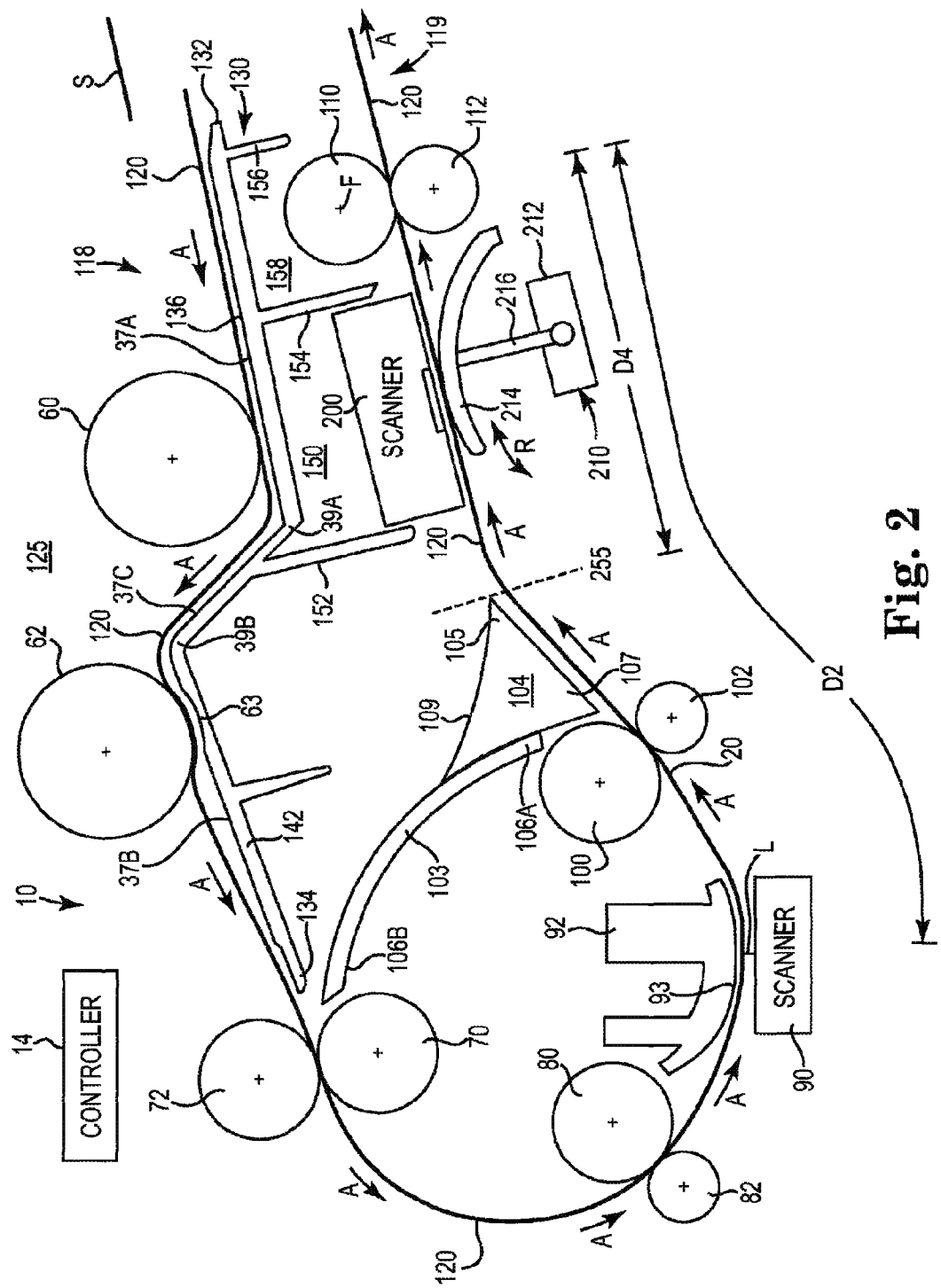
FIG. 2 is a front plan view schematically illustrating a scanner assembly in a second configuration, according to an embodiment of the present disclosure.

At the time of manufacture or during a retrofit, scanner assembly 10 is configurable between the first configuration 11 (as shown in FIG. 1) and a second configuration 125, which is shown in FIG. 2. As shown in FIG. 2, according to one embodiment of the present disclosure, in the second configuration 125 scanner assembly 10 generally includes substantially the same components as in first configuration 11 except for the additional inclusion of a second scanner 200, substitution of a different (second) separation floor 130, and re-positioning of exit rollers 110, 112.

Figure 3:
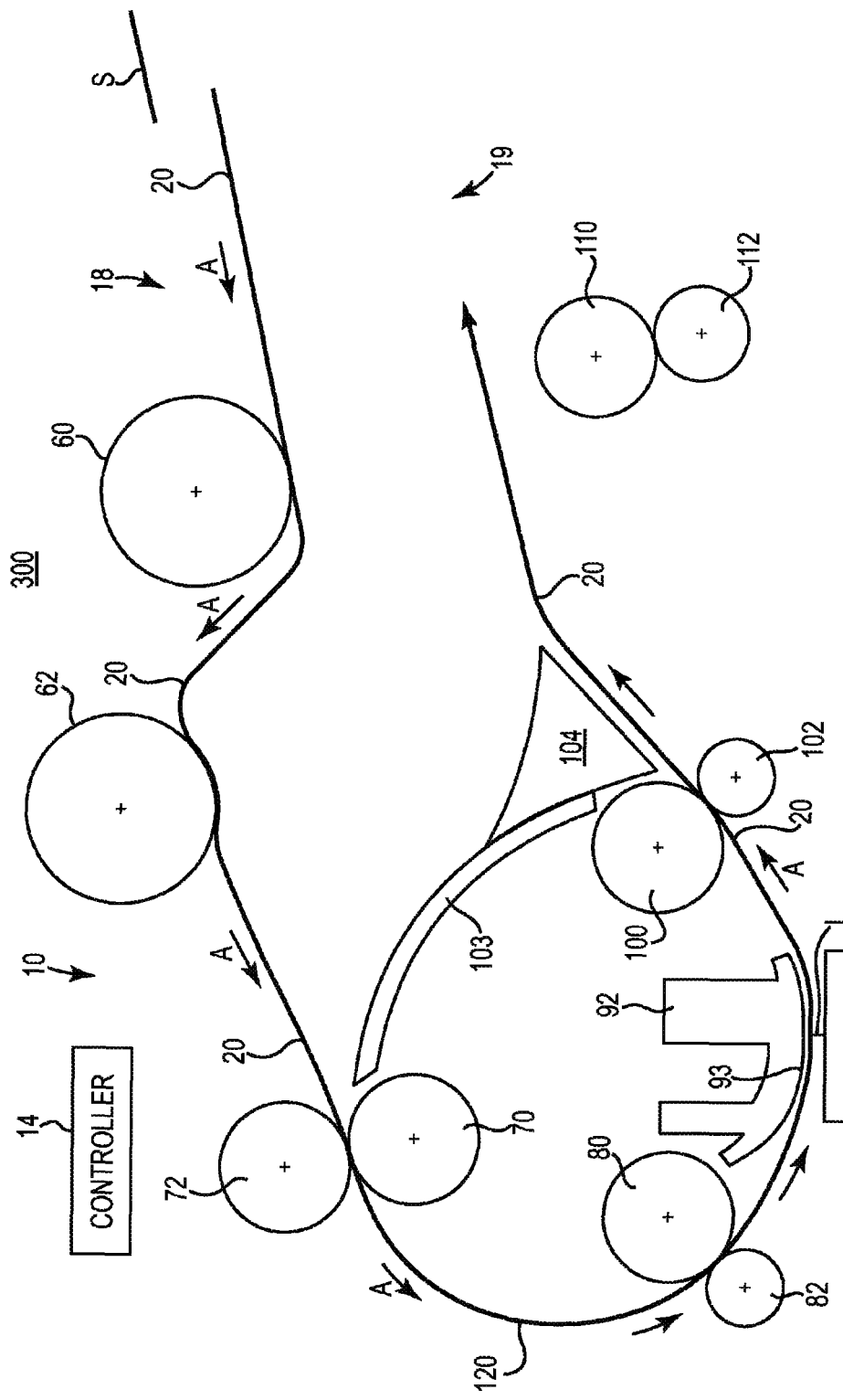
FIG. 3 is a front plan view schematically illustrating certain components of a scanner assembly prior to assembly into one of a first configuration or a second configuration, according to an embodiment of the present disclosure.

In one aspect, a core "automatic document feeder" structure having elements common to both the first configuration 11 and the second configuration 125 is shown in FIG. 3. Accordingly, FIG. 3 schematically illustrates a partial assembled scanner assembly 300 prior to fully deployment in the first configuration 11 or the second configuration 125. With this core structure in mind, further reference is made to FIG. 2 which schematically illustrates inclusion (in the second configuration) of a second separation floor 130, second scanner 200, and re-positioned exit rollers 110, 112.

In particular, as shown in FIG. 2, the second configuration 125 comprises a second separation floor 130 that includes a contact portion 136 having substantially the same shape and features as contact portion 36 of first separation floor 30. However, bottom portion 138 of second separation floor 130 omits a first return guide 41 and structures 56 (both in first configuration 11) while retaining a chamber (e.g. chamber 150) between first and second walls 152, 154. In one aspect, by omitting first return guide 41, second configuration 125 of scanner assembly 10 omits a return path from separator 104 to point X near deskew rollers 70, 72 because in the second configuration, the sheet will pass through media pathway 120 just one time. Moreover, the bottom portion 138 of second separation floor 130 defines a second chamber 157 between the second wall 154 and a third wall 156. This second chamber 157 is sized and shaped to at least partially house exit roller 110, as further described later in association with FIG. 3. Accordingly, bottom portion 138 of second separation floor 130 includes a pair of chambers 150, 158 arranged in a side-by-side pattern to accommodate both second scanner 200 and exit roller 110. In one aspect, these side-by-side chambers 150, 158 are located on a second side 23 of media pathway 120.

In addition, as shown in FIG. 2, second configuration 125 of scanner assembly 10 includes a second background module 210 located opposite second scanner 200. In one embodiment, second background module 210 includes a base 212, arm 216, and background element 214. In one aspect, background element 214 includes a generally convex arcuate shape that faces second scanner 200. Via arm 216, background element 214 is rotatably movable (as represented by directional arrow R) to enable presentation of different surface portions of second background element 214 to second scanner 200. Further details regarding the second background element 214 are later described in association with FIG. 5.

As further shown in FIG. 2, in order to accommodate the presence of second scanner 200, in the second configuration 125 the exit rollers 110, 112 are re-positioned further downstream from first scanner 90. As noted above, in this second configuration 125, exit roller 110 is recessed within chamber 158 of bottom portion 138 of second separation floor 130. In this arrangement, the rotational axis (F) of exit roller 110 is spaced apart along media pathway 120 from scan line (L) of first scanner 90 by a distance (D2). In one aspect, this distance D2 is substantially greater than the distance D1 from scan line L to exit roller 110 in the first configuration 11 (FIG. 1). In another aspect, in the second configuration 125, a rotational axis (F) of exit roller 110 is spaced apart from tip 105 of separator 104 by a fourth distance (D4).

With the structure of the second configuration 125 in mind, the sheet travels along media pathway 120 without any return path, such that the first side of the media sheet is scanned via first scanner 90 and the second side of the media sheet is scanned via second scanner 200 (before exiting via output portion 19).

While FIG. 1 illustrates a completed assembly in the first configuration 11 and FIG. 2 illustrates a completed assembly in the second configuration, FIG. 3 schematically illustrates a partially assembled scanner assembly 300 that includes certain components common to both the first configuration 11 and the second configuration 125. Accordingly, when assembling either the first configuration 11 or the second configuration, in one embodiment the process generally begins the partial assembly 300 shown in FIG. 3. To build the first configuration, one adds the following components: (1) first separation floor 30 with return guide 41; and (2) exit rollers 110, 112 mounted in the first position. To build the second configuration, one adds the following components: (1) second separation floor 130 with chambers 150 and 158; (2) exit rollers 110, 112 mounted in the second position; and (3) second scanner 200 and background module 210.

However, it will be understood that in other embodiments, the first configuration 11 in its completed assembly is converted to the second configuration 125 by removing certain components unique to the first configuration 11 and replacing them with certain components unique to the second configuration 125. A similar process is performed to convert a scanner assembly from the second configuration 125 to the first configuration 11.

Figure 4:
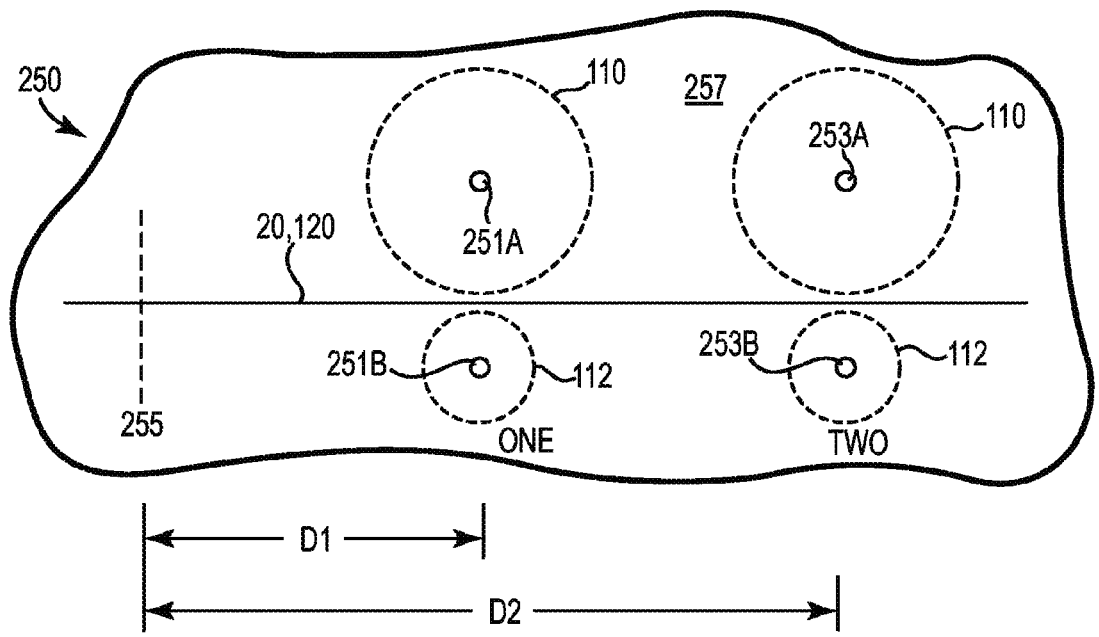
FIG. 4 is a diagram schematically illustrating multiple positions of an exit roller of a scanner assembly, according to an embodiment of the present disclosure.

FIG. 4 provides a diagram 250 further illustrating the two different positions of frame 257 of scanner assembly 10 in which exit rollers 110, 112 are mountable in the first and second configurations 11, 125, according to one embodiment of the present disclosure. As shown in FIG. 4, in the first configuration 11 of scanner assembly 10, the exit rollers 110, 112 are located in position ONE via mounting holes 251A, 251B in frame 257 such that the rotational axis F of exit roller 110 is spaced apart from point 255 (generally corresponding to tip 105 of separator 104) by a distance of D1 (FIGS. 1 and 4). In the second configuration 125 of scanner assembly 10, the exit rollers 110, 112 are located in position TWO via mounting holes 253A, 253B in frame 257 such that the rotational axis F of exit roller 110 is spaced apart from point 55 by a distance of D2 (FIGS. 2 and 4). By mounting exit rollers 110, 112 in one of the two positions ONE and TWO, one of two different configurations 11, 125 of scanner assembly 10 is achieved. Of course, a similar comparison applies between distance D3 in the first configuration 11 and distance D4 in the second configuration 125 in which distance D4 is substantially greater than distance D3.

Figure 5:
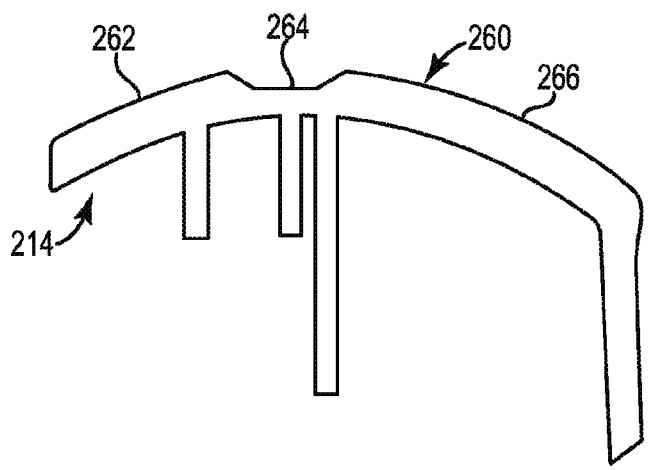
FIG. 5 is a front plan view of a scan background element, according to an embodiment of the present disclosure.

FIG. 5 is a side view of second background element 214, according to an embodiment of the present disclosure. As shown in FIG. 5, second background element 214 includes a generally curved upper surface 260 defining a first calibration surface 262, a first background surface 264, and a second background surface 266. By rotation of arm 216 (as represented by directional arrow R in FIG. 2), the respective different surfaces 262, 264, 266 are selectively presented to second scanner 200. For example, when it is time to calibrate second scanner 200, the background element 214 is rotated so that calibration surface 262 is exposed to second scanner 200, and thereby enables calibration of second scanner 200. However, when it is desired to scan with first background surface 264, the background element 214 is rotated to expose first background surface 264 to second scanner 200. In one embodiment, first background surface 264 is a black background surface. When it is desired to scan with second background surface 266, the background element 214 is rotated to expose second background surface 266 to second scanner 200. In one embodiment, second background surface 266 is a white background surface used for regular scanning. It will be understood that background element 214 is automatically rotated into an appropriate position based on the scanning mode selected by a user (via a user interface or software driver) and communicated to unit 212 (FIG. 2) by controller 14.

In one embodiment, the devices, structures, and components described in association with FIGS. 1-5 are employed in a method of manufacturing a scanner assembly. In other embodiments, the method of manufacturing is performed via devices, structures, and components other than those described in association with FIGS. 1-5.

In one method of manufacturing, an automatic document feeder is provided (as part of a scanner assembly) that defines a generally C-shaped media pathway that includes an input portion, a scan portion, and an output portion arranged in series. In one aspect, the output portion includes an exit roller. Initially the exit roller is not assigned a position until one of a first configuration or a second configuration is chosen for assembly. At that time, one of at least two different positions on a frame of the device is selected at which the exit roller can be mounted in a first position corresponding to the first configuration or in a second position corresponding to the second configuration.

In addition, in one embodiment the input portion includes a first separation floor in the first configuration and includes a different second separation floor in the second configuration. While the contact portion of the respective separation floors are substantially the same, a bottom portion of the respective separation floors are substantially different. Finally, prior to beginning assembly, a second scanner is made available for deployment in the second configuration but not in the first configuration.

With this in mind, the respective input, scan, and output portions are assembled in at least one of the first configuration and the second configuration. The first configuration includes a single scanner in the scan portion and includes a return path extending from output portion to the media pathway at a position upstream from the first scanner. In this first configuration, the automatic document feeder is configured to scan both a first side and a second side of the media via the single scanner. The second configuration includes an additional scanner in the scan portion downstream from the first scanner and interposed between the first scanner and the exit roller of the output portion. In the second configuration, the automatic document feeder is configured to scan the first side of media via the first scanner and to scan the second side of media via the second scanner.

Embodiments of the present disclosure are directed to a scanner assembly that is configurable, at the time of manufacture, into one of two configurations. In a first configuration, the scanner assembly includes a single first scanner and an internal sheet return path enabling multiple passes of the sheet by the single scanner. In a second configuration, the scanner assembly includes two scanners (one of which is the first scanner) and no internal return path. Each configuration uses a different separation floor, with the first separation floor in the first configuration housing an exit roller and the second separation floor in the second configuration housing both a second scanner and the exit roller (although in a different position than in the first configuration).

By retaining a core portion of the sheet pathway in each of the two different configurations, a significant amount of time, money, and effort is saved instead of the laborious and expensive conventional process that otherwise occurs when manufacturing and assembling two completely different scanning assemblies to produce a single scanner configuration or a dual scanner configuration.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this present disclosure be limited only by the claims and the equivalents thereof.

What is claimed is:

1. A scanner assembly comprising:
an automatic document feeder defining a media pathway that includes an input portion and an output portion having an exit roller;
a first scanner positioned along the media pathway upstream from the exit roller; and
a space between said input portion and said output portion;
wherein, in a first assembled configuration, the space is occupied by a first separation floor comprising a surface portion defining a return media pathway connecting with said input portion and to provide for scanning both a first side and a second side of the media via the first scanner, and
wherein, in a second assembled configuration, the same space is alternatively occupied by a second separation floor which includes a second scanner positioned along the output portion and interposed between the first scanner and the exit roller, wherein the assembly is to scan the first side of media via the first scanner and to scan the second side of media via the second scanner.

2. The scanner assembly of claim 1, wherein the media pathway has a generally C-shaped configuration in which the input portion of the media pathway corresponds to media travel in a first direction and the output portion of the media pathway corresponds to media travel in a second direction.

3. The scanner assembly of claim 1, wherein in the second assembled configuration, the first scanner is positioned on a first side of the media pathway and the second scanner is positioned on a second side of media pathway, opposite the first side.

4. The scanner assembly of claim 1, wherein, in the first assembled configuration, the exit roller is located in a first position spaced apart from the first scanner by a first distance and, in the second assembled configuration, the exit roller is located in a second position spaced apart from the first scanner by a second distance, substantially larger than the first distance.

5. The scanner assembly of claim 1, wherein, in the first assembled configuration, the first separation floor at least partially houses the exit roller in a first position.

6. The scanner assembly of claim 5, wherein, in the second assembled configuration, the second separation floor at least partially houses the exit roller in a second position, different from said first position.

7. The scanner assembly of claim 1, wherein, in the second assembled configuration, the assembly includes:
an automatically selectable background module positioned on a first side of the media pathway opposite the second scanner, wherein the background module includes a background surface pivotally mounted relative to a base to enable positioning different portions of the background surface relative to the second scanner.

8. The scanner assembly of claim 7, wherein the background module includes a calibration surface adjacent to the background surface with the calibration surface selectively exposed to the second scanner upon the scanner assembly entering a calibration mode.

9. An automatic document feeder assembly comprising:
a first media pathway that includes an input portion, a scan portion, and an output portion arranged in series,
wherein the first media pathway forms a C-shape with a space in between said input portion and output portion, said space being sized to accommodate either a first set of components in a first assembled configuration or a second set of components in a second assembled configuration;
the first assembled configuration comprising said first set of components in said space, said first set of components comprising a second media pathway extending from the output portion to the first media pathway at a point upstream from the first scanner, wherein the assembly is to enable scanning both a first side and a second side of the media via the first scanner, and
the second assembled configuration comprising the second set of components in said space, said second set of components comprising a second scanner, wherein the assembly is to scan the first side of media via the first scanner and to scan the second side of media via the second scanner.

10. The automatic document feeder assembly of claim 9, wherein, in the first configuration, the first set of components comprises a first separation floor that includes a contact portion at least partially defining the input portion, a surface portion at least partially defining said second media pathway and a bottom portion, the bottom portion including a first chamber sized and shaped to partially house an exit roller.

11. The automatic document feeder assembly of claim 9, wherein, in the second configuration, the second set of components comprises a second separation floor that includes a contact portion at least partially defining the input portion and a bottom portion, the bottom portion including:
a first chamber sized and shaped to partially house the second scanner; and
a second chamber sized and shaped to partially house an exit roller.

12. A method of manufacturing a scanner assembly, the method comprising:
providing an automatic document feeder defining a generally C-shaped first media pathway to guide a media sheet, the automatic document feeder including an input portion, a scan portion comprising a first scanner, and an output portion arranged in series, wherein the output portion includes an exit roller;
determining whether the scanner assembly is to having mechanical duplexing or dual scanners; and
if the scanner assembly is to have mechanical duplexing, assembling into a space between the input and output portions, a first configuration comprising a surface portion at least partially defining a return pathway
extending from the output portion to the first media pathway at a position upstream from the first scanner, the return pathway providing for scanning both a first side and a second side of the media sheet via the single scanner; and
if the scanner assembly is to have dual scanners, alternatively assembling into said same space a second configuration including a second scanner downstream from the first scanner and interposed between the first scanner and the exit roller, the second configuration to scan the first side of media via the first scanner and to scan the second side of media via the second scanner.

13. The method of claim 12, further comprising, prior to assembly in either the first configuration or the second configuration, providing a first separation floor for the first configuration and a second separation floor for the second configuration, wherein the first separation floor includes a return path guide; and arranging the automatic document feeder in a partially assembled state that omits the respective first or second separation floors, that omits the second scanner, and in which exit rollers are not mounted in the automatic document feeder.

14. The method of claim 12, wherein in the second configuration, a second separation floor includes a contact portion at least partially defining the input portion and a bottom portion, the bottom portion including:

a first chamber sized and shaped to partially house the second scanner; and a second chamber sized and shaped to partially house the exit roller.

15. The method of claim 12, wherein in the first configuration, a first separation floor includes a contact portion at least partially defining the input portion and a bottom portion, the bottom portion including:

a first chamber sized and shaped to partially house the exit roller; and a return structure sized and shaped to guide media sheets in a return pathway from the output portion to the media pathway at a point upstream from the first scanner.

16. The automatic document feeder assembly of claim 9, wherein, in the second assembled configuration, the assembly comprises:

an automatically selectable background module positioned on a first side of the first media pathway opposite the second scanner, wherein the background module includes a background surface pivotally mounted relative to a base to enable positioning different portions of the background surface relative to the second scanner.

17. The automatic document feeder assembly of claim 16, wherein the background module includes a calibration surface adjacent to the background surface with the calibration surface selectively exposed to the second scanner upon the automatic document feeder assembly entering a calibration mode.

18. The automatic document feeder assembly of claim 9, wherein both the first and second sets of components comprise an exit roller, said exit roller being at a first position in said space in said first set of components and at a second position within said space in said second set of components.

19. The scanner assembly of claim 7, wherein the background surface comprises both a black background portion and a white background portion, either of which may be presented to the second scanner by pivoting the background surface relative to the base.

20. The automatic document feeder assembly of claim 17, wherein the background surface comprises both a black background portion and a white background portion, either of which may be presented to the second scanner by movement of the pivotally mounted background surface relative to the base.

* * * * *